Patented Jan. 22, 1952

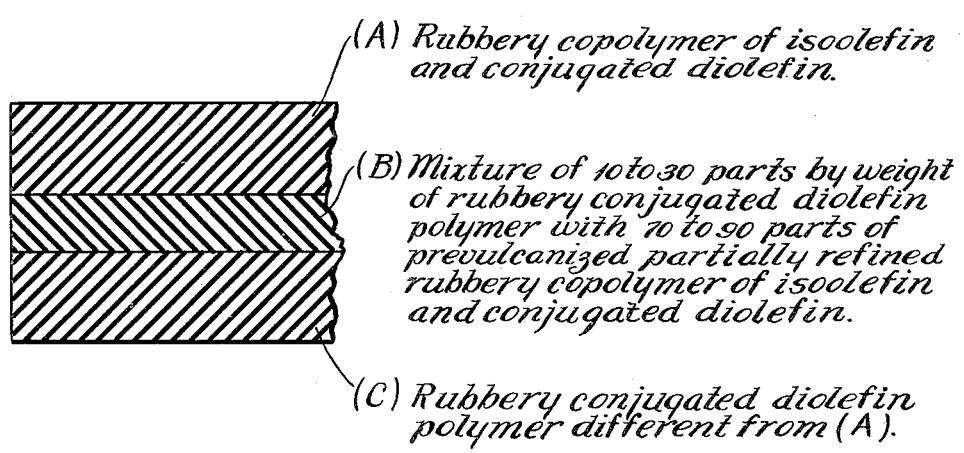

2,583,387

UNITED STATES PATENT OFFICE 2,583,387

RUBBERY ADHESIVE COMPOSITION AND METHOD OF MAKING AND USING THE SAME

Richard T. Morrissey, Cuyahoga Falls, and Richard A. Crawford, Akron, Ohio, assignors to The B. F. Goodrich Company, New York, N. Y., a corporation of New York Application September 18, 1948, Serial No. 50,003

16 Claims. (Cl. 154—139)

1

This invention relates to a rubbery adhesive composition, the method of making same and a composite structure obtained therewith. More particularly, the invention is concerned with adhering two rubbery bodies together, at least one of which comprises a rubbery isoolefin-diolefin copolymer, by means of an adhesive composition prepared as set forth hereinafter.

The rubbery copolymers of a major proportion of an isoolefin having from 4 to 7 carbon atoms with a minor proportion of an open-chain conjugated diolefin having from 4 to 8 carbon atoms, known commercially as "butyl" rubber, are very poorly adherent to other rubber materials. Various adhesive compositions prepared in conventional manner have been tried in an effort to solve this problem with only moderate success.

It is an object of this invention to provide an adhesive composition whereby greatly improved adhesion can be obtained between the rubbery isoolefin-diolefin copolymer and other vulcanizable rubber, whether crude or synthetic.

This object is accomplished in accordance with this invention by disposing between a body of rubbery isoolefin-diolefin copolymer and a body of a vulcanizable rubber normally poorly adherent thereto, an adhesive composition prepared by blending 10 to 30 parts by weight of the unvulcanized vulcanizable rubber to be adhered to the copolymer and 70 to 90 parts by weight of the rubbery isoolefin-diolefin copolymer which has been vulcanized and then partially refined or masticated to a condition where the vulcanized copolymer on a refiner begins to cohere into loose crumbly agglomerates but possesses insufficient plasticity to form a continuous sheet, and thereafter vulcanizing the assembly. An adhesive composition prepared in this manner from an unvulcanized rubber composition and partially refined vulcanized "butyl" rubber will give an adhesive bond of as much as 50 pounds per linear inch at room temperature and 20 pounds per linear inch at 250° F. when a film of the adhesive composition is disposed between a rubber composition and a "butyl" rubber composition, and the assembly is vulcanized.

In the drawing appended hereto there is shown an embodiment of this invention in which a layer A of rubbery copolymer of isoolefin and conjugated diolefin is adhered to a layer C of rubbery conjugated diolefin polymer different from that in A by means of an intermediate layer B of a mixture of 10 to 30 parts by weight of rubbery conjugated diolefin polymer with 70 to 90 parts of prevulcanized partially refined rubbery copolymer of isoolefin and conjugated diolefin.

2

The particular reason why an adhesive composition prepared in this manner gives such greatly improved adhesion is not understood, and the scope of the invention will not be limited by any theory which might be advanced by way of explanation. It has been found, however, that unrefined vulcanized "butyl" rubber cannot be blended successfully with unvulcanized crude (by which is meant naturally occurring rubber such as caoutchouc or the like) or synthetic rubber. Furthermore, if the vulcanized "butyl" rubber is refined until it becomes plastic so as to form a continuous sheet and this refined copolymer is blended with another vulcanizable rubber, the resulting composition does not give comparable adhesion values. In order for optimum adhesion to result, the vulcanized isoolefin-diolefin copolymer is preferably only partially refined so that the copolymer does not powder completely on a refiner but forms loose crumbly agglomerates greatly resembling vulcanized crude rubber which has been subjected to mechanical attrition, such as grinding, without any substantial reclaiming or plastication resulting. The partially refined copolymer in this condition possesses little plasticity and tackiness, will not form a continuous sheet without further refining, and is insoluble in practically all of the common volatile organic rubber solvents. It has a dry feel and a dull surface appearance.

The rubbery isoolefin-diolefin copolymers which are included in this invention are referred to as "butyl" rubber are those rubbery plastic hydrocarbon copolymers prepared by the low temperature copolymerization of a major proportion of an isoolefin and a minor proportion of an open-chain conjugated diolefin according to the usual method of copolymerizing such monomers as disclosed in detail in U. S. Patents 2,356,128; 2,356,129; and 2,356,130 to Thomas and Sparks. The copolymers are commonly prepared by copolymerizing a major proportion of an isoolefin having from 4 to 7 carbon atoms with a minor proportion of an open-chain conjugated diolefin having from 4 to 8 carbon atoms, and the copolymer is desirably the copolymer of a major proportion of isobutylene with a minor proportion of isoprene. Preferably the copolymer comprises from 70 or 80 to 99½ parts by weight of an isomonoolefin such as isobutylene or ethyl methyl ethylene copolymerized with from ½ to 20 or 30 parts by weight of an open-chain conjugated diolefin such as isoprene; butadiene-1,3; piperylene; 2,3-dimethyl butadiene-1,3; 1,2-dimethyl butadiene-1,3 (or 3-methyl pentadiene-1,3); 1,3-dimethyl butadiene-1,3; 1-ethyl butadiene-1,3 (or hexadiene-1,3); 1,4-dimethyl butadiene-1,3 (or hexadiene-2,4); and the like. Typical examples of these synthetic rubbers are known to the trade as "GR-I," "butyl A," "butyl B," "butyl C" and "Flexon."

By means of this invention, a body of "butyl" rubber may be strongly adhered to any vulcanizable polymeric organic rubber material, whether crude or synthetic, and any sulfur vulcanizable rubber may be used including such naturally occurring crude rubbers as caoutchouc, and the like, or such synthetic rubbers as the rubbery polymers of the open-chain conjugated diolefins having from 4 to 8 carbon atoms such as the butadiene-1,3 hydrocarbons which include butadiene-1,3, isoprene, 2,3-dimethyl butadiene-1,3, 1,4-dimethyl butadiene-1,3 and the like; or the copolymers of these and similar materials with each other or with such copolymerizable monomeric materials as isobutylene, styrene, acrylonitrile, methacrylonitrile, methyl acrylate, methyl methacrylate, ethyl acrylate, ethyl methacrylate, 2-vinyl pyridine and similar materials. The invention is particularly adapted for adhering a body of "butyl" rubber to a sulfur vulcanizable rubbery hydrocarbon polymer such as crude rubber or a butadiene copolymer such as a rubbery butadiene-styrene copolymer. If desired, however, the adhesive composition may be used as a surface coating or paint on a rubbery article where the coat must adhere well.

The rubber material employed in accordance with this invention may, of course, be compounded with any of the commonly employed compounding ingredients therefor including reinforcing agents, vulcanizing agents and accelerators therefor, fillers, anti-oxidants, softeners, and similar well-known compounding ingredients in the amounts and proportions in accordance with conventional compounding practices.

The adhesive composition comprises 100 parts by weight of rubber material consisting of 70 to 90 parts by weight of the partially refined vulcanized "butyl" rubber as set forth hereinabove and 10 to 30 parts by weight of unvulcanized vulcanizable polymeric organic rubber material. The last-named rubber material preferably is the same rubber as that rubber to which the body of "butyl" rubber is to be adhered, i. e., if it is desired to bond a body of crude rubber to a body of "butyl" rubber, the adhesive composition preferably comprises 10 to 30 parts by weight of crude rubber. It is necessary to maintain the proportions of the rubber materials within the limits set forth hereinabove to ensure adhesion to both bodies of rubber. The optimum ratio of rubbery constituents in the adhesive composition is 80 parts by weight of the partially refined "butyl" rubber to 20 parts by weight of another vulcanizable rubber or rubbers.

In preparing a typical adhesive composition, a conventional "butyl" rubber composition is mixed and vulcanized. A typical formula is as follows:

| Material: | Parts by weight |
|---|---|
| Isobutylene-isoprene rubber (97:3 copolymer) | 100.0 |
| Carbon black | 50.0 |
| Zinc oxide | 5.0 |
| Dinitroso benzene | 0.1 |
| Sulfur | 2.0 |
| 2-mercaptobenzothiazole | 0.5 |
| Tetramethyl thiuram disulfide | 1.0 |
| Total | 158.6 |

This composition is vulcanized in the usual manner as, for example, by heating the composition at 320° F. for 10 minutes. The resulting vulcanized composition is thereafter partially refined to a condition where the copolymer begins to cohere into loose crumbly agglomerates but possesses insufficient plasticity to form a continuous sheet.

The vulcanizate may be brought into this condition by means of heat degradation as by heating in an air oven but the refining is preferably accomplished by mechanical mastication. Thus in the preferred procedure, the vulcanizate is ground and then passed through a tight mill (e. g. 0.007" roll clearance) or through a conventional rubber refiner mill as used in reclaiming vulcanized rubber until the desired degree of refinement is obtained. As stated hereinabove, the ground vulcanizate is not refined until it becomes tacky as is usually done in refining rubber but is only partially refined so that the physical characteristics are more nearly those of the original ground vulcanizate than of completely refined rubber. In this condition, the copolymer forms loose agglomerates which tend to powder and do not form a continuous sheet on the mill.

This partially refined copolymer is insoluble in most common rubber solvents including gasoline and due to its non-tacky character and lack of plasticity, it cannot be successfully employed as either a tie gum or a cement.

The partially refined copolymer is then blended with another sulfur vulcanizable rubber in the ratio of 70 to 90 parts of the copolymer with 10 to 30 parts of such other rubber. If, for example, the adhesive composition is to be used for bonding a body of crude rubber to a body of "butyl" rubber, a partially refined copolymer is blended with crude rubber. The crude rubber is preferably compounded in accordance with conventional compounding practices and preferably has been milled to soften it so that the partially refined copolymer is not further broken down by the mixing operation.

A typical crude rubber composition which may be employed is as follows:

| Material: | Parts by weight |
|---|---|
| Crude rubber | 100.0 |
| Whiting | 45.0 |
| Zinc oxide | 2.0 |
| Carbon black | 10.0 |
| Sulfur | 3.0 |
| Softening oil | 4.0 |
| 2-mercaptobenzothiazole | 0.5 |
| 2,2' benzothiazyl disulfide | 1.0 |
| Total | 165.5 |

This composition is mill mixed in accordance with ordinary rubber processing techniques and 80 parts by weight of the partially refined copolymer are mixed with 20 parts by weight of the milled crude rubber composition. The partially refined copolymer blends readily with the crude rubber and forms a continuous sheet. The resulting blend is readily soluble in the ordinary rubber solvents including gasoline even though the partially refined copolymer itself is insoluble in such solvents. Thus the blended adhesive composition may be employed directly as a tie gum in sheet form or it may be dissolved in gasoline, naphtha or similar volatile organic solvent and used as a cement.

In a typical composite article, such as a tubeless tire, having a layer of "butyl" rubber in face-to-face abutting relation to a layer of crude rubber composition, the respective layers are painted with the adhesive composition in cement form, the solvent is allowed to evaporate and the layers pressed together into adhering relation. When the tire is thereafter vulcanized in the usual manner, the opposed layers are strongly bonded together so that the structure tears through the rubbery layers before separation of the adhesive bond. The adhesion between the composition is at least 25 pounds and as much as 50 pounds per linear inch when tested at room temperature with values of 40 pounds per linear inch being commonly obtained. The adhesion value at 212° F. is at least 15 pounds and as much as 25 pounds per linear inch, with values of 20 pounds per linear inch being commonly obtained.

Similarly, a body of "butyl" rubber may be strongly adhered to another vulcanizable rubber such as, for example, a rubbery butadiene-styrene copolymer, a rubbery chloroprene polymer or a rubbery butadiene-acrylonitrile copolymer, using such other rubber in combination with the partially refined "butyl" rubber in the adhesive composition. In such cases, when a composite structure is assembled comprising a body of "butyl" rubber and a body of such other rubber, both in the unvulcanized condition, and a layer of an adhesive composition embodying this invention interposed therebetween, the structure, after vulcanization, is bonded together so that the structure tears through the rubbery bodies before the adhesive bond fails.

Variations and modifications may be effected within the spirit and scope of the invention as defined in the appended claims.

We claim:

1. An adhesive composition for adhering a composition comprising a rubbery copolymer of a major proportion of isobutylene with a minor proportion of isoprene to a crude rubber composition, said adhesive composition comprising 100 parts by weight of a homogeneous mixture of rubber materials consisting of 10 to 30 parts by weight of unvulcanized crude rubber and 70 to 90 parts by weight of said rubbery copolymer which has been vulcanized and thereafter partially refined by mechanical mastication to a condition where the vulcanized copolymer begins to cohere into loose agglomerates but possesses insufficient plasticity to form a continuous sheet.

2. An adhesive composition for adhering a composition comprising a rubbery copolymer of from 80 to 99½ parts by weight of isobutylene with from ½ to 20 parts by weight of isoprene to a composition comprising a vulcanized rubbery polymer of an open-chain conjugated diolefin, said adhesive composition comprising a solution in a volatile organic solvent of 100 parts by weight of a homogeneous mixture consisting of 10 to 30 parts by weight of said rubbery polymer of an open-chain conjugated diolefin in an unvulcanized condition and 70 to 90 parts by weight of said rubbery copolymer which has been vulcanized and thereafter partially refined by mechanical mastication to a condition where the vulcanized copolymer begins to cohere into loose agglomerates but possesses insufficient plasticity to form a continuous sheet.

3. An adhesive composition for adhering a composition comprising a rubbery copolymer of from 80 to 99½ parts by weight of isobutylene with from ½ to 20 parts by weight of isoprene to a crude rubber composition, said adhesive composition comprising a solution in a volatile organic solvent of a composition comprising 100 parts by weight of a homogeneous mixture of 10 to 30 parts by weight of unvulcanized crude rubber and 70 to 90 parts by weight of said rubbery copolymer which, before incorporation into said crude rubber, has been vulcanized and thereafter partially refined by mechanical mastication to a condition where the vulcanized copolymer begins to cohere into loose agglomerates but posseses insufficient plasticity to form a continuous sheet.

4. A method of making an adhesive composition which comprises vulcanizing a compounded composition of a rubbery copolymer of a major proportion of an isoolefin having from 4 to 7 carbon atoms and a minor proportion of an open-chain conjugated diolefin having from 4 to 8 carbon atoms, partially refining the vulcanized copolymer by mechanical mastication to a condition where the copolymer begins to cohere into loose agglomerates but possesses insufficient plasticity to form a continuous sheet, and thereafter mixing said partially refined copolymer composition with a compounded composition of a different rubbery polymer of an open-chain conjugated diolefin in an unvulcanized condition so that the mixture contains from 70 to 90 parts by weight of said partially refined copolymer and from 10 to 30 parts by weight of said unvulcanized polymer.

5. The method of making an adhesive composition which comprises vulcanizing a compounded composition of a rubbery copolymer of 80 to 99½ parts of an isoolefin having from 4 to 7 carbon atoms and from ½ to 20 parts of an open-chain conjugated diolefin having from 4 to 8 carbon atoms, partially refining the vulcanized copolymer by mechanical mastication to a condition where the copolymer begins to cohere into loose agglomerates but possesses insufficient plasticity to form a continuous sheet, and thereafter mixing said partially refined copolymer composition with an unvulcanized compounded crude rubber composition to produce a mixture containing 70 to 90 parts by weight of said partially refined copolymer and 10 to 30 parts of said crude rubber.

6. A method of making an adhesive composition which comprises vulcanizing a composition comprising a rubbery copolymer of from 80 to 99½ parts of isobutylene and from ½ to 20 parts of isoprene, partially refining the vulcanized copolymer by mechanical mastication to a condition where the copolymer begins to cohere into loose agglomerates but possesses insufficient plasticity to form a continuous sheet, and thereafter mixing said partially refined copolymer composition with an unvulcanized crude rubber composition containing a vulcanizing agent on a roll mill to form a continuous sheet of a mixture containing 70 to 90 parts by weight of said partially refined copolymer and from 10 to 30 parts of said crude rubber.

7. The method of making an adhesive composition which comprises vulcanizing a composition comprising a rubbery copolymer of from 80 to 99½ parts of isobutylene with from ½ to 20 parts of isoprene, partially refining the vulcanized copolymer by mechanical mastication to a condition where the copolymer begins to cohere into loose agglomerates but possesses insufficient plasticity to form a continuous sheet, mixing said partially refined copolymer composition with an unvulcanized crude rubber composition containing a vulcanizing agent to give a homogeneous coherent mixture containing 70 to 90 parts by weight of said partially refined copolymer and from 10 to 30 parts of said crude rubber, and thereafter dissolving said mixture in a volatile organic solvent.

8. An unvulcanized vulcanizable composite structure comprising a body of a composition comprising a rubbery copolymer of a major proportion of an isoolefin having from 4 to 7 carbon atoms with a minor proportion of an open-chain conjugated diolefin having from 4 to 8 carbon atoms, an opposing body of a composition comprising a rubbery polymer of an open-chain conjugated diolefin, which rubbery polymer is different from the first-named rubbery copolymer, and an intermediate body of adhesive composition comprising a mixture of (a) 10 to 30 parts by weight of said last-named rubbery polymer and (b) 70 to 90 parts of said first-named rubbery copolymer which copolymer has been vulcanized and thereafter partially refined by mechanical mastication to a condition where it begins to cohere into loose agglomerates but possesses insufficient plasticity to form a continuous sheet, each of said compositions containing a vulcanizing agent.

9. An unvulcanized vulcanizable composite structure comprising a body of a composition comprising a rubbery copolymer of 80 to 99½ parts by weight of isobutylene and ½ to 20 parts of isoprene, an opposed body of a composition comprising a rubbery polymer of an open-chain conjugated diolefin having from 4 to 8 carbon atoms, said rubbery polymer being different from said first-named rubbery copolymer, and an intermediate body of adhesive composition comprising a mixture of (a) 10 to 30 parts by weight of said last-named rubbery polymer and (b) 70 to 90 parts of said first-named rubbery copolymer which copolymer has been vulcanized and thereafter partially refined by mechanical mastication to a condition where it begins to cohere into loose agglomerates but possesses insufficient plasticity to form a continuous sheet, each of said compositions containing a vulcanizing agent.

10. An unvulcanized vulcanizable composite structure comprising a body of a composition comprising a rubbery copolymer of 80 to 99½ parts by weight of isobutylene and ½ to 20 parts by weight of isoprene, an opposed body of a composition comprising crude rubber, and an intermediate body of an adhesive composition comprising a mixture of 10 to 30 parts by weight of crude rubber and 70 to 90 parts of said rubbery copolymer which copolymer has been vulcanized and thereafter partially refined by mechanical mastication to a condition where it begins to cohere into loose agglomerates but possesses insufficient plasticity to form a continuous sheet, each of said compositions containing a vulcanizing agent.

11. The method of adhering together a body of a composition comprising a rubbery copolymer of from 80 to 99½ parts by weight of an isoolefin having from 4 to 7 carbon atoms and from ½ to 20 parts by weight of an open-chain conjugated diolefin having from 4 to 8 carbon atoms, and a body of a composition comprising a different rubbery polymer of an open-chain conjugated diolefin, which method comprises interposing between said bodies a layer of rubbery composition comprising a mixture of from 10 to 30 parts by weight of said rubbery diolefin polymer in an unvulcanized condition, 70 to 90 parts by weight of said rubbery copolymer which has been vulcanized and partially refined by mechanical mastication to a condition in which the copolymer begins to cohere into loose agglomerates but possesses insufficient plasticity to form a continuous sheet, and a vulcanizing agent, and heating said bodies in contact with said layer to vulcanize the assembly.

12. The method of adhering together a body of vulcanizable composition comprising a vulcanizing agent and a rubbery copolymer of 80 to 99½ parts by weight of an isoolefin having from 4 to 7 carbon atoms and ½ to 20 parts of an open chain conjugated diolefin having from 4 to 8 carbon atoms, and a body of a vulcanizable composition comprising a vulcanizing agent and crude rubber, which method comprises interposing between said bodies a layer of vulcanizable adhesive composition comprising a vulcanizing agent and a mixture of 10 to 30 parts by weight of crude rubber and 70 to 90 parts of said rubbery copolymer which copolymer has been vulcanized and thereafter partially refined by mechanical mastication to a condition where it begins to cohere into loose agglomerates but possesses insufficient plasticity to form a continuous sheet, and heating said bodies in contact with said layer to vulcanize the assembly and bond said bodies together.

13. The method of adhering together a body of vulcanizable composition comprising a vulcanizing agent and a rubbery copolymer of 80 to 99½ parts by weight of isobutylene and ½ to 20 parts of isoprene, and a body of a vulcanizable composition comprising a vulcanizing agent and crude rubber, which method comprises interposing between said bodies a layer of vulcanizable adhesive composition comprising a vulcanizing agent and a mixture of 10 to 30 parts by weight of crude rubber and 70 to 90 parts of said rubbery copolymer which copolymer has been vulcanized and thereafter partially refined by mechanical mastication to a condition where it begins to cohere into loose agglomerates but possesses insufficient plasticity to form a continuous sheet, and heating said bodies in contact with said layer to vulcanize the assembly and bond said bodies together.

14. A composition comprising a homogeneous mixture of (a) 70 to 90 parts by weight of a rubbery copolymer of a major proportion of an isoolefin having from 4 to 7 carbon atoms with a minor proportion of an open-chain conjugated diolefin having from 4 to 8 carbon atoms, and (b) 10 to 30 parts by weight of a vulcanizable rubbery polymer of an open-chain conjugated diolefin having from 4 to 8 carbon atoms, the rubbery polymer of (b) being different from the rubbery copolymer of (a), the copolymer of (a) having the properties obtained by vulcanizing and thereafter partially refining it by mechanical mastication to a condition where it begins to cohere into loose agglomerates but possesses insufficient plasticity to form a continuous sheet.

15. A composition comprising a homogeneous mixture of 10 to 30 parts by weight of unvulcanized crude rubber and 70 to 90 parts by weight of a rubbery copolymer of from 80 to 99½ parts by weight of an isoolefin having from 4 to 7 carbon atoms with from ½ to 20 parts by weight of an open-chain aliphatic conjugated diolefin having from 4 to 8 carbon atoms, which copolymer has the properties obtained by vulcanizing and thereafter partially refining it by mechanical mastication to a condition where it begins to cohere into loose agglomerates but possesses insufficient plasticity to form a continuous sheet.

16. A composition comprising a homogeneous mixture of 10 to 30 parts by weight of unvulcanized crude rubber and 70 to 90 parts by weight of a rubbery copolymer of from 80 to 99½ parts by weight of isobutylene with from ½ to 20 parts by weight of isoprene, which copolymer has the properties obtained by vulcanizing and thereafter partially refining it by mechanical mastication to a condition where the vulcanized copolymer begins to cohere into loose agglomerates but possesses insufficient plasticity to form a continuous sheet, and a vulcanizing agent for said rubber materials.

RICHARD T. MORRISSEY.
RICHARD A. CRAWFORD.

REFERENCES CITED

The following references are of record in the file of this patent:

UNITED STATES PATENTS

| Number | Name | Date |
|---|---|---|
| 2,278,802 | Sarbach | Apr. 7, 1942 |
| 2,332,194 | Beekley et al. | Oct. 19, 1943 |
| 2,378,717 | Macey | June 19, 1945 |
| 2,395,071 | Sarbach | Feb. 19, 1946 |
| 2,405,943 | Doering et al. | Aug. 20, 1946 |
| 2,442,083 | Hall et al. | May 25, 1948 |
| 2,443,678 | Garvey | June 22, 1948 |
| 2,467,322 | Lightbown | Apr. 12, 1949 |

OTHER REFERENCES

Lightbown, pp. 377–380, Rubber Age, August 1942.